United States Patent
Takeuchi et al.

(10) Patent No.: US 12,080,183 B2
(45) Date of Patent: Sep. 3, 2024

(54) MULTI-PURPOSE FIXTURE TOOL FOR MANIPULATION TRAINING

(71) Applicant: FASOTEC CO., LTD., Chiba (JP)

(72) Inventors: Junichi Takeuchi, Chiba (JP); Takkafumi Miyamoto, Chiba (JP); Takeshi Anraku, Chiba (JP); Masashi Okamoto, Chiba (JP)

(73) Assignee: Fasotec Co., Ltd., Chiba (JP)

( * ) Notice: Subject to any disclaimer, the term of this patent is extended or adjusted under 35 U.S.C. 154(b) by 939 days.

(21) Appl. No.: 16/972,154

(22) PCT Filed: Jun. 8, 2018

(86) PCT No.: PCT/JP2018/022123
§ 371 (c)(1),
(2) Date: Dec. 4, 2020

(87) PCT Pub. No.: WO2019/234937
PCT Pub. Date: Dec. 12, 2019

(65) Prior Publication Data
US 2021/0241655 A1    Aug. 5, 2021

(51) Int. Cl.
*G09B 23/28*      (2006.01)
(52) U.S. Cl.
CPC .................. *G09B 23/285* (2013.01)
(58) Field of Classification Search
CPC ........ G09B 23/28; G09B 23/30; G09B 23/36; G09B 23/306
See application file for complete search history.

(56) References Cited

U.S. PATENT DOCUMENTS

| | | | |
|---|---|---|---|
| 5,403,191 A * | 4/1995 | Tuason | G09B 23/285 434/262 |
| 5,722,836 A * | 3/1998 | Younker | G09B 23/285 434/258 |
| 2007/0166681 A1* | 7/2007 | Hemphill | G09B 23/28 434/262 |

(Continued)

FOREIGN PATENT DOCUMENTS

| | | |
|---|---|---|
| JP | 2001-005378 A | 1/2001 |
| JP | 2008241988 A * | 10/2008 |

(Continued)

*Primary Examiner* — Jay Trent Liddle
*Assistant Examiner* — Alyssa N Brandley
(74) *Attorney, Agent, or Firm* — Ogilvie Law Firm

(57) ABSTRACT

Provided is a fixture tool for securing a bio-textured organ model created by reproducing or deforming the texture and appearance of an actual organ for manipulation training. The fixture tool includes a fixture body and a plurality of holding parts attachable to and detachable from the fixture body. The fixture body includes: integrally connected plates composed of a rectangular center plate and mutually opposing first and second plates rotatably connected to both long sides of the center plate via hinges; and a leg attached to the lower surface of the center plate. The first and second plates have a locking section for securing the holding part. The holding part has a holding surface capable of holding the bio-textured organ model. The holding part is configured such that the holding surface inclines relative to a plate surface when the holding part is secured to the first and second plates.

20 Claims, 11 Drawing Sheets

(56) References Cited

U.S. PATENT DOCUMENTS

2012/0015339 A1* 1/2012 Hendrickson .......... G09B 23/30
   434/273
2016/0275819 A1 9/2016 Hofstetter et al.

FOREIGN PATENT DOCUMENTS

| JP | 3177527 U | 8/2012 |
| JP | 2013-127496 A | 6/2013 |
| JP | 2014-033735 A | 2/2014 |
| JP | 2017-223850 A | 12/2017 |

* cited by examiner (1)

(2)

(1)

(2)

(1)

(2)

(1)

(2)

(1)

(2)

(1)

(2)

(1)

(2)

MULTI-PURPOSE FIXTURE TOOL FOR MANIPULATION TRAINING

TECHNICAL FIELD

The present invention relates to an apparatus for fixing internal organ models and such to provide a procedure training object for a procedure training for surgical operations including pneumoscopic/laparoscopic surgeries and such.

BACKGROUND ART

Conventionally, training to develop specialists in surgical operation has been performed through clinical trials, animal experiments, and the use of a cadaver (human corpse for dissection) by targeting patients. However, from a social and moral point of view, it is required to drastically reduce the frequency of animal experiments, improve the safety of clinical trials along with the reduction of the number of clinical trials, with ever stronger needs for realizing medical technology to be an alternative and a training system for realizing safety improvement.

On the other hand, there is an increasing need for three-dimensional visualization of affected areas and specific parts of the body in the medical field for informed consent, decision making of medical treatment policy, medical education, medical research, and the like. In particular, in the case of 3D visualization using a 3D modeling model, it is possible to convey a lot of information that cannot be conveyed by a computer image, by actually touching and viewing the three-dimensional shape as well as the visual sense. In recent years, a three-dimensional printer capable of producing a three-dimensional molding model using resins having different mechanical properties by combining a hard resin and a flexible resin by simultaneous injection of a plurality of resins has been known, and it has become possible to reproduce the surface and even the internal structure of the shape structure.

Further, a technology for producing a biological texture model that can reproduce not only the feel of biological organs possessed by specialists such as doctors but also mechanical characteristics close to those of living organisms has been disclosed (Refer to Patent Document 1).

By using a biological texture model that can reproduce mechanical characteristics close to that of a living body as disclosed in Patent Document 1, more effective surgical training has become possible.

However, there is a problem in that the procedure training tends to become monotonous for the trainer. Therefore, in order to maintain the motivation for training, it is desirable to change the difficulty level according to the proficiency level of the surgeon, but there is a problem that it is not possible to meet such needs simply by making the organ model closer to the living body.

In general, the difficulty level of surgery varies greatly depending on the position, angle or condition of organs, etc. For example, in the case of performing film peeling training, the difficulty level differs between the case of peeling a film located on a flat surface and the case of peeling a film in a recessed state. In addition, when treating the skin, the difficulty level of incision and suture differs depending on whether the skin is taut or not.

It is impossible to express such a change in difficulty only by the nature of the organ model.

As a technique for increasing the difficulty of the procedure training, a surgical practice kit that enables a training to handle an organ supported in an unstable state in a narrow space is known (Refer to Patent Document 2). This creates an unstable state by connecting the mounting table on which the organs are placed to the top plate using a string-like body and suspending it.

However, in the surgical practice kit disclosed in Patent Document 2, although it is possible to make the organ unstable, the training pattern is limited, and the difficulty level cannot be freely changed for training, which is a problem.

Further, a simulator for surgical procedure training that can tilt a platform on which an organ for training is placed so as to be anatomically similar to an actual operation is known (Refer to Patent Document 3).

This is to change the angle of the platform to be fixed with a set screw, making it possible to have a simulated experience similar to actual heart surgery by tilting the platform by about 30°. In this way, in the procedure training, it is possible to change the difficulty level of the training simply by changing the angle of the organ. However, the simulator for surgical technique training disclosed in Patent Document 3 does not provide various patterns of the procedure training.

PRIOR ART

Patent Literature

[Patent literature 1] JP2016-87359A
[Patent literature 2] JP2017-223850A
[Patent literature 3] JP2001-5378A

OUTLINE OF THE INVENTION

Problems to be Solved by the Invention

In general, there is a problem that the procedure training tends to be monotonous for the trainer. In order to maintain the motivation for training, it is effective for the surgeon to imagine the training scenario, set up the difficulty level to challenge himself, and experience the joy of clearing the set difficulty level. However, there is no fixture for procedure training that allows the surgeon to easily change the difficulty level of the training.

In view of such a situation, it is an object of the present invention to provide a multi-purpose fixture tool capable of providing training for various procedures and easily changing the difficulty level of the training.

Means to Solve the Objects

To solve the above problems, a multi-purpose fixture tool for manipulation training of the present invention is a fixture tool for securing a bio-textured organ model created by reproducing or deforming the texture and the appearance of an actual organ for manipulation training for operations. The fixture tool includes a fixture body and a plurality of holding parts attachable to and detachable from the fixture body. The fixture body includes: integrally connected plates composed of a rectangular center plate and mutually opposing first and second plates rotatably connected to both long sides of the center plate via hinges; and a leg attached to the lower surface of the center plate. The first and second plates have a locking section for securing the holding part. The holding part has a holding surface capable of holding the bio-textured organ model. The holding part is configured such that the holding surface inclines relative to a plate surface when the holding part is secured to the first and second plates.

By rotatably facing each other and arranging the plates via the hinge portion, the plate connecting body can be deformed into a shape that meets the needs of the operator.

The central plate, the first plate and the second plate are preferably made of resin, but other materials such as metal may be used.

By providing the holding member locking portions on the first and second plates, the position and angle of the holding member locked to the holding member locking portion can be freely adjusted, and the difficulty level adjustment in the procedure training becomes easier.

It is preferable that the holding surface is provided with at least one of a hooks portion or a loops portion of the hook-and-loop fastener.

Examples of the biological texture organ to be fixed include a biological texture model that reproduces mechanical characteristics close to those of a living body.

In the multi-purpose fixture tool for manipulation training of the present invention, in the plate connecting body, it is preferable that the left and the right holding surfaces do not come into contact with each other and a gap is formed above the central plate when the first and second plates are rotated by a hinge portion so that the holding surface of the holding member becomes horizontal and arranged to be bisymmetrical around the long axis of the central plate.

Until now, when performing a procedure training, it was common to train with the organs placed on a mounting table. However, in actual surgery, there is no mounting table for organs in the patient's body. Accordingly, for example, when training for anastomosis of organs, it is preferable that there is no mounting table in the vicinity of the anastomosis site. Therefore, by providing a gap in which the holding surfaces do not come into contact with each other, a space in which the mounting table does not exist is created, and the gap is used as a place for performing a procedure such as anastomosis, thereby enabling smooth training.

In the multi-purpose fixture tool for manipulation training of the present invention, the holding member is configured in such a way that the angle between the normal of the holding surface and the normal of the plate surface is in the range of 40~50° when locked to the first and second plates, and more preferably in the range of 43~47°. If the angle between the normal of the holding surface and the normal of the plate surface exceeds 50°, the area of the holding surface becomes narrower and sufficient space for arranging the biological texture organs cannot be obtained. Further, if the angle is less than 40°, it becomes difficult to form a recess that can accommodate a part of the biological texture organ described later.

In the multi-purpose fixture tool for manipulation training of the present invention, the holding member, when locked to the first and second plates, preferably possesses a recess on the central plate side capable of storing a part of the biological texture organ.

The shape of the plate connecting body can be freely changed by bending the first or second plate of the central plate up and down via the hinge portion. Therefore, for example, when a skin model is used as a biological texture organ, the shape of the skin model can be changed by bending the first or the second plate while the skin model is fixed on the plate connecting body.

Therefore, when the holding member is locked to the first and second plates, the skin model and the like can be stably held by having a recess on the central plate side capable of accommodating a part of the biological texture organ. An elastic body for holding a biological texture organ may be used in the recess.

In the multi-purpose fixture tool for manipulation training of the present invention, it is preferable that the fixture further includes at least one fastener, and a fastener stationary portion capable of fixing a fastener to a plate is disposed on at least one of plates constituting the plate connecting body.

Although the fastener is used to fix the biological texture organ, the biological texture organ may be fixed only by the fastener or may be used in combination with the holding member. By being provided with a fastener, various fixings become possible.

In the multi-purpose fixture tool for manipulation training of the present invention, the fastener preferably includes a magnet and is made of a metal or an alloy in which all or a part of at least one of the plates constituting the plate connecting member exhibits ferromagnetism.

By fixing the fastener with a magnet, the fixing position and the orientation can be freely adjusted, improving convenience.

In the multi-purpose fixture tool for manipulation training of the present invention, it is preferable that the leg member includes a joint mechanism or a ball joint mechanism, and the posture of the central plate can be adjusted by using the mechanism.

Since the central plate is connected to the first and second plates, the posture of the central plate can be adjusted, so that the postures of the first and second plates can be adjusted together with that of the central plate, and various angles can be adjusted. Therefore, it is more preferable that the legs are provided with a ball joint mechanism.

Further, it is preferable that a fixing mechanism such as a suction cup is provided at the bottom of the leg. By providing such a mechanism, the fixture body is stable even during training, and effective training becomes possible.

The multi-purpose fixture tool for manipulation training of the present invention can be installed on a desk for training, or can be installed and used in a known dry box or a simulator.

In the multi-purpose fixture tool for manipulation training of the present invention, the first and second plates are preferably rectangular like the central plate, and the length of the long side is substantially the same as that of the long side of the central plate.

In the multi-purpose fixture tool for manipulation training of the present invention, the first and second plates may be provided with plates rotatably connected via a hinge portion on the long side opposite to the long side connected to the central plate.

By further providing the plates on the outside of the first and second plates, the shape of the plate connecting body can be adjusted more flexibly, and the difficulty level can be easily changed. Moreover, the plate may be further extended to the outside of the extended plate.

The plates in which the first and second plates are rotatably connected to the long side opposite to the long side connected to the central plate via the hinge portion are attached to the first and second plates. It may have the same function as the holding member. That is, in such a case, the plates connected to the first and second plates preferably have a holding surface capable of holding the biological texture organ, and also a recess capable of accommodating a part of the biological texture organ may be formable.

In the multi-purpose fixture tool for manipulation training of the present invention, the first and second plates have a polygonal shape having a side of substantially the same length as that of the long side of the central plate, or a semicircle having a diameter or a chord substantially the same length as that of the long side of the central plate.

The first and second plates can be polygonal or semicircular in consideration of the biological texture organ to be fixed, the type of training or the convenience of the operator.

In the multi-purpose fixture tool for manipulation training of the present invention, the first and second plates preferably have the same shape and are symmetrical with respect to the long axis of the central plate.

The stability of the fixture body is improved by making it the same shape and symmetrical.

Effects of the Invention

According to the multi-purpose fixture tool of the present invention, there is an effect that training can be performed for various procedures, and the difficulty level can be easily changed. In addition, since the operator who performs the training can easily change the difficulty level of the training, there is an effect that the operator can experience the joy of clearing the set difficulty level and maintain the training motivation of the operator.

BEST MODE FOR CARRYING OUT THE INVENTION

Embodiments of the present invention will be described in detail below with reference to the drawings. The present invention is not limited to the following embodiments and examples shown in the figures, and the present invention can be variously changed in design.

Embodiment 1

Figure 1:
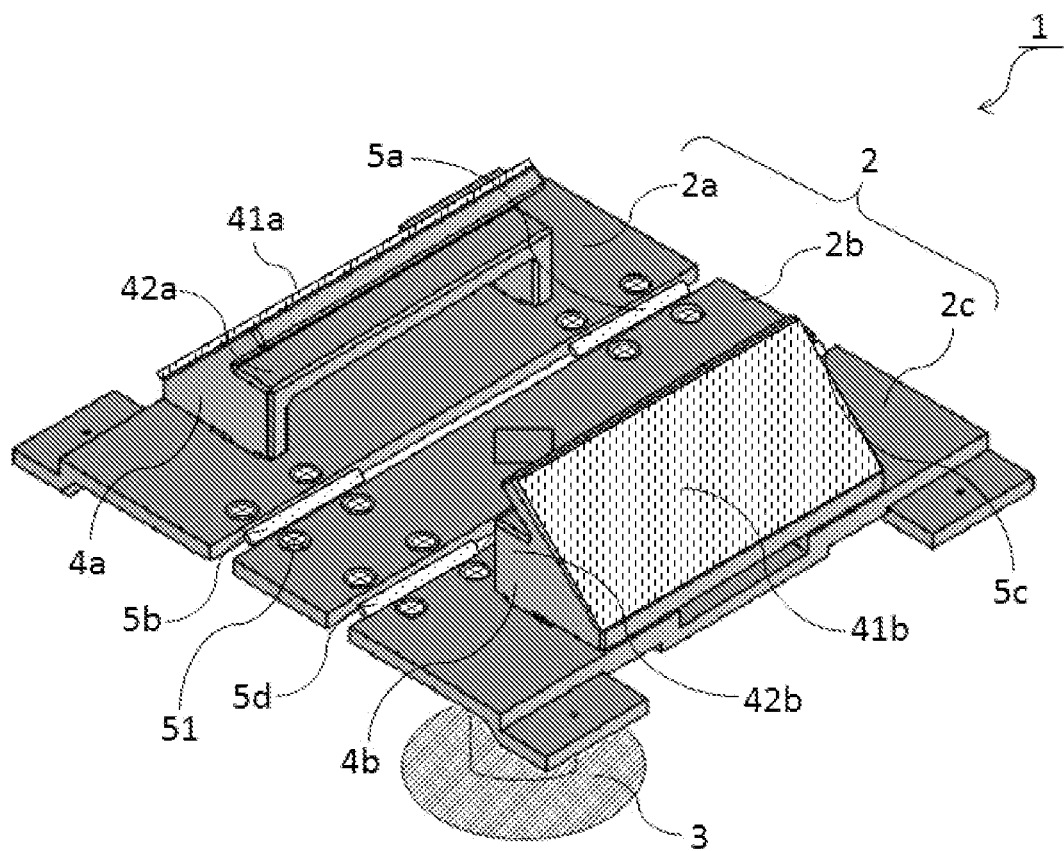
FIG. 1 shows a perspective view of a multi-purpose fixture tool of Embodiment 1.

FIG. 1 shows a perspective view 1 of the multi-purpose fixture tool of Embodiment 1. As shown in FIG. 1, the multipurpose fixture 1 includes a plate connecting body 2, legs 3, and holding members (4a, 4b). The plate connecting body 2 is composed of plates (2a~2c) and is rotatably connected by hinges (5a~5d). The specific structure will be described with reference to FIG. 2 and FIG. 3.

Figure 2:
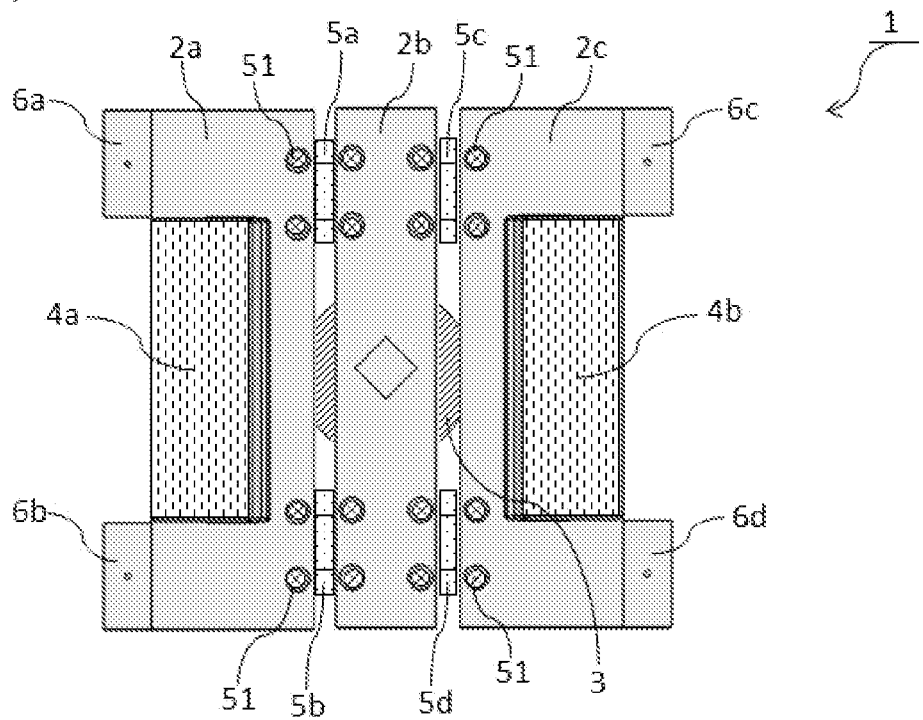
FIG. 2 shows an external view 1 of a multi-purpose fixture tool of Embodiment 1.
Figure 2:
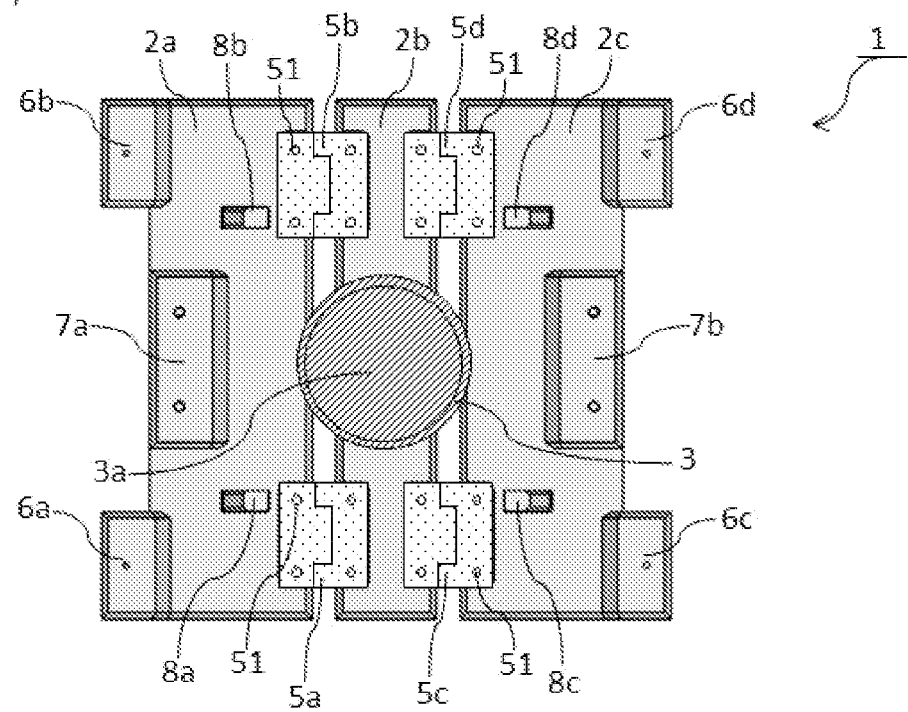
Figure 3:
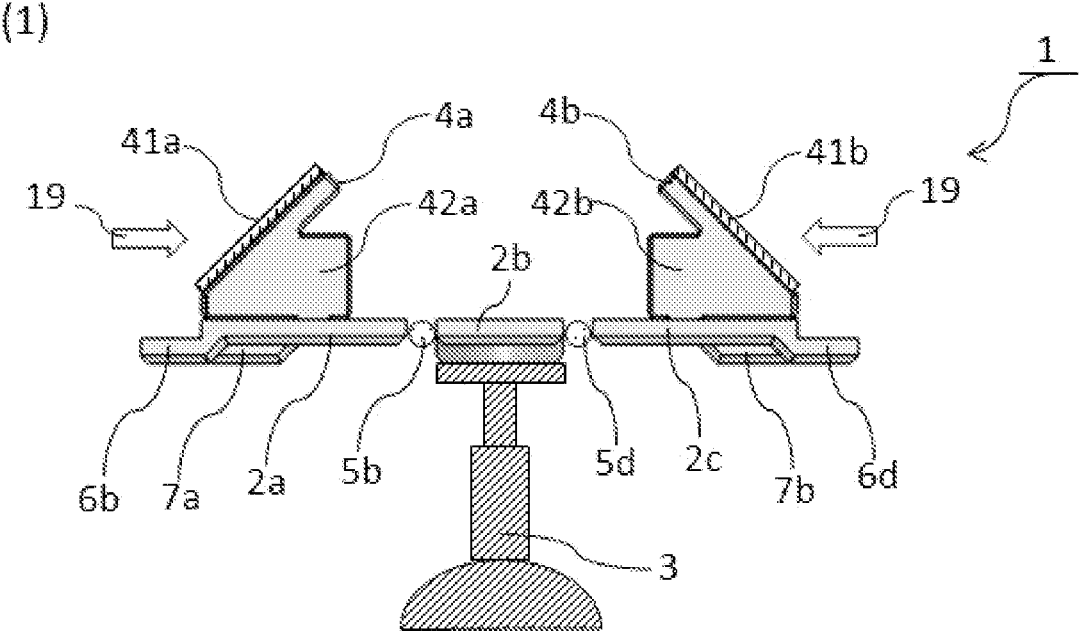
FIG. 3 shows an external view 2 of a multi-purpose fixture tool of Embodiment 1.
Figure 3:
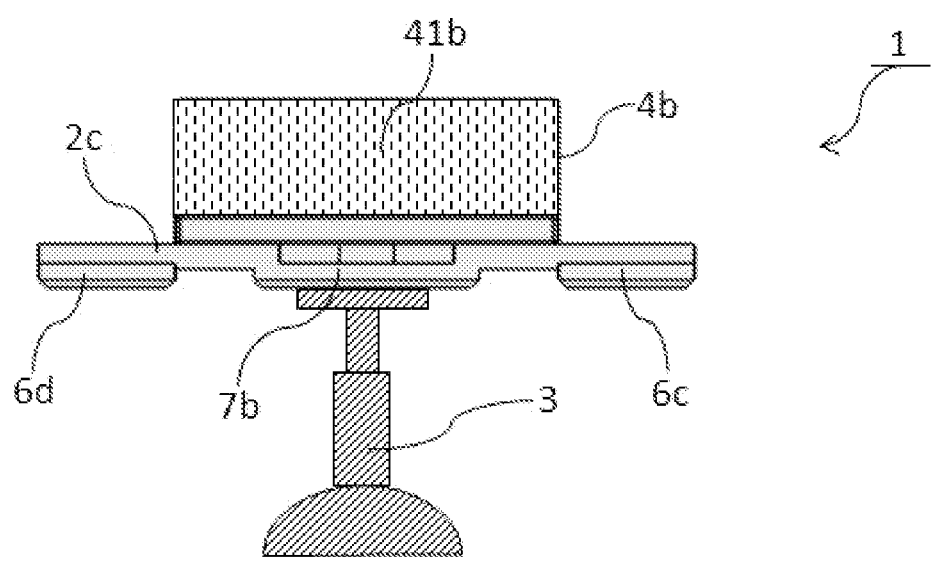

FIG. 2 and FIG. 3 are external views of a multipurpose fixture of Embodiment 1, FIG. 2 (1) is a plan view, and FIG. 2 (2) is a bottom view. Further, FIG. 3 (1) shows a front view, and FIG. 3 (2) shows a right side view.

As shown in FIG. 2 (1), the hinges (5a, 5b) are fixed to the plates 2a and 2b using screws 51. Further, the hinges (5c, 5d) are fixed to the plates 2b and 2c using screws 51. The plates 2a and 2b, or the plates 2b and 2c, are rotatably connected by hinges (5a~5d).

The plate 2a is provided with clip fixing portions (6a, 6b) made of ferromagnetic metal, and the plate 2c is also provided with clip fixing portions (6c, 6d) made of ferromagnetic metal.

Further, as shown in FIG. 2 (2), the plate 2a is provided with an engaging portion 7a and locking portions (8a, 8b) for fixing the holding member 4a. Similarly, the plate 2c is provided with an engaging portion 7b and locking portions (8c, 8d) for fixing the holding member 4b.

The holding members (4a, 4b) can be detachably attached according to the content of the procedure training. When attaching the holding members (4a, 4b) to the plates (2a, 2c), as shown by the arrow 19 in FIG. 3 (1), by sliding the holding member from both ends of each plate (2a, 2c) to the engaging portions (7a, 7b), they are locked by the locking portions (8a-8d). By providing the locking portions (8a-8d), it is possible to prevent the holding members (4a, 4b) from falling off from the plates (2a, 2c).

The holding members (4a, 4b) are provided with hook-and-loop fasteners (41a, 41b) and holding portions (42a, 42b).

The hook-and-loop fasteners (41a, 41b) are provided with a hook member of the hook-and-loop fasteners on one surface, but contrarily, a loop portion may be provided. And the surface normal of the hook-and-loop fasteners (41a, 41b) are provided at an angle of approximately 45° with respect to the surface normal of the plates (2a, 2c), which is because the plates (2a and 2c) are bent to create a mounting portion having a gap.

As shown in FIG. 1, the holding portions (42a, 42b) are provided so that holes are formed under a state wherein the holding members (4a, 4b) are attached to the plates (2a, 2c).

Also, the plates (2a to 2c) and the holding members (4a, 4b) are made of resin, but other materials such as metal may be used.

As shown in FIGS. 3 (1) and 3 (2), the leg portion 3 is attached to the lower surface of the plate 2b. Although details are not shown, the leg portion 3 has a structure that can be adjusted and fixed in an arbitrary direction and angle by a ball joint.

Further, as shown in FIG. 2 (2), a suction cup 3a is provided on the bottom surface of the leg portion 3, constituting a structure that can be stably fixed at the installation location. The multipurpose fixture 1 can be installed on a desk for training, or can be installed and used in a known dry box or simulator.

Although not shown, the leg portion 3 is provided with a male screw portion at the upper portion and is screwed to the female screw portion provided on the lower surface of the plate 2b. Therefore, for example, it is possible to replace the leg portion 3 as needed.

Figure 4:
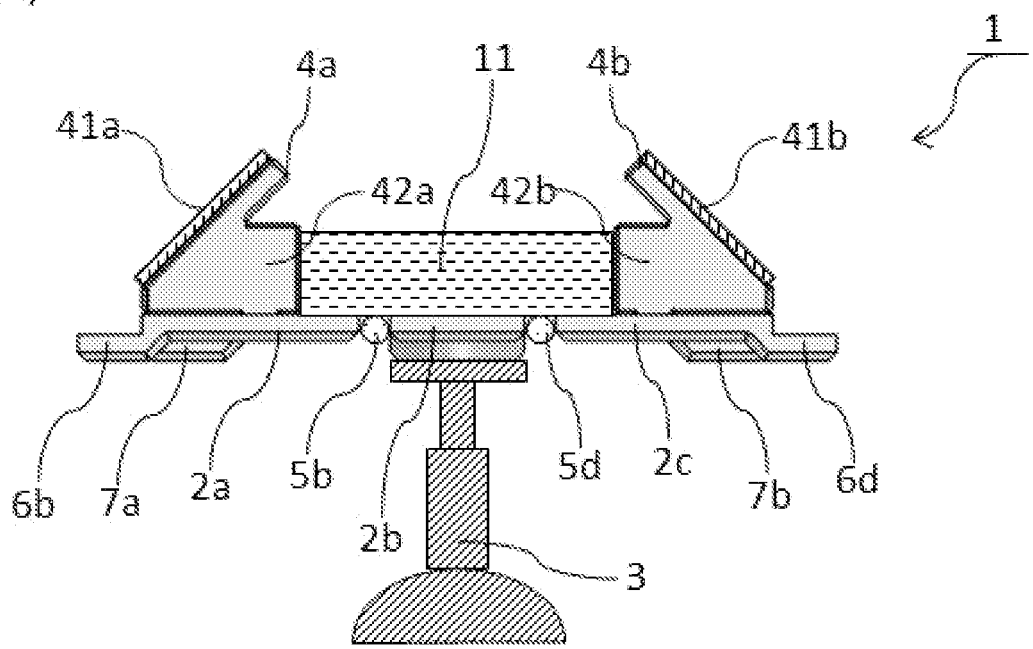
FIG. 4 shows an explanatory view of mounting a skin model.
Figure 4:
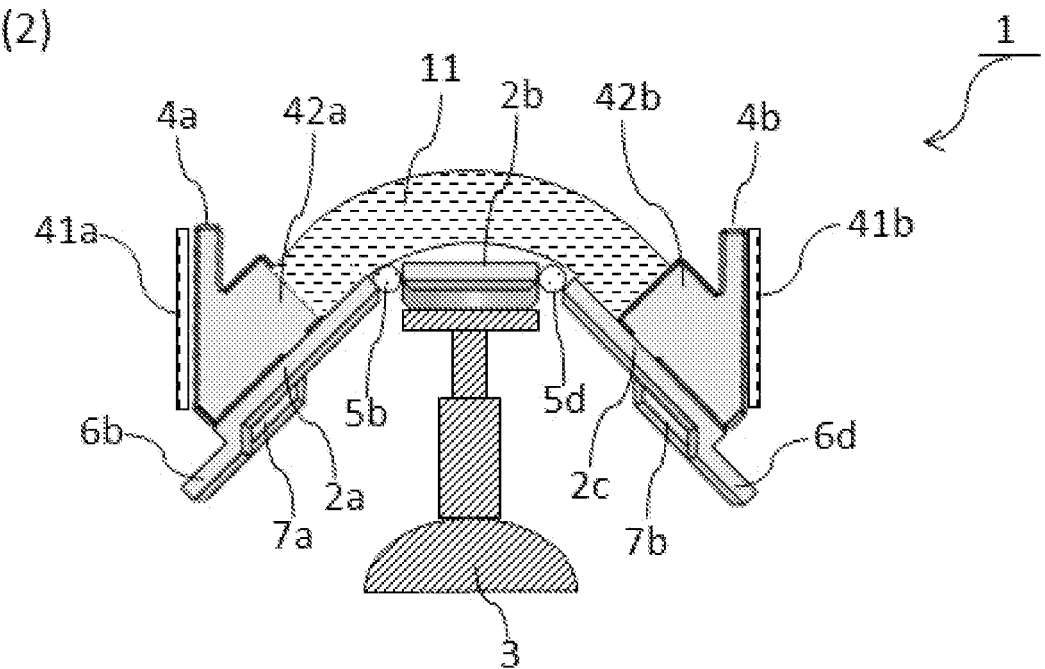

FIG. 4 is an explanatory view of mounting the skin model, in which (1) shows before tension is applied and (2) shows after tension is applied. As shown in FIG. 4 (1), a skin model 11 is attached to the multipurpose fixture 1. Specifically, the skin model 11 is inserted into and sandwiched between the sandwiching portion 42a of the holding member 4a and the sandwiching portion 42b of the holding member 4b, respectively. In such a state, it is possible to perform training on procedures such as skin incision and suturing.

However, it is thought that depending on the skill level of the surgeon, a higher difficulty level training may be possibly desired. In such a case, being different from an example shown in FIG. 4 (1), a state wherein the skin is taut can be created for training. Namely, as shown in FIG. 4 (2), by bending the plate (2a, 2c) downward while the skin model 11 is inserted into the sandwiching portions (42a, 42b), a state wherein the skin model 11 is stretched can be brought about. If the incision is made while the skin model 11 is stretched, the incised portion is likely to expand, and thus the difficulty of suturing increases. Here, the state in which the plates (2a, 2c) are bent downward by about 450 is shown, but the difficulty level can be freely changed by finely adjusting the bending angle.

Since such adjustment of the difficulty level can be performed by the operator himself/herself, the operator can imagine the training scenario by himself/herself, devise and set the challenge level, and experience the joy of clearing the set difficulty level. By using a fixture that allows the operator to easily change the difficulty level of training in this way, the operator can maintain a sense of purpose and maintain motivation for training.

Figure 5:
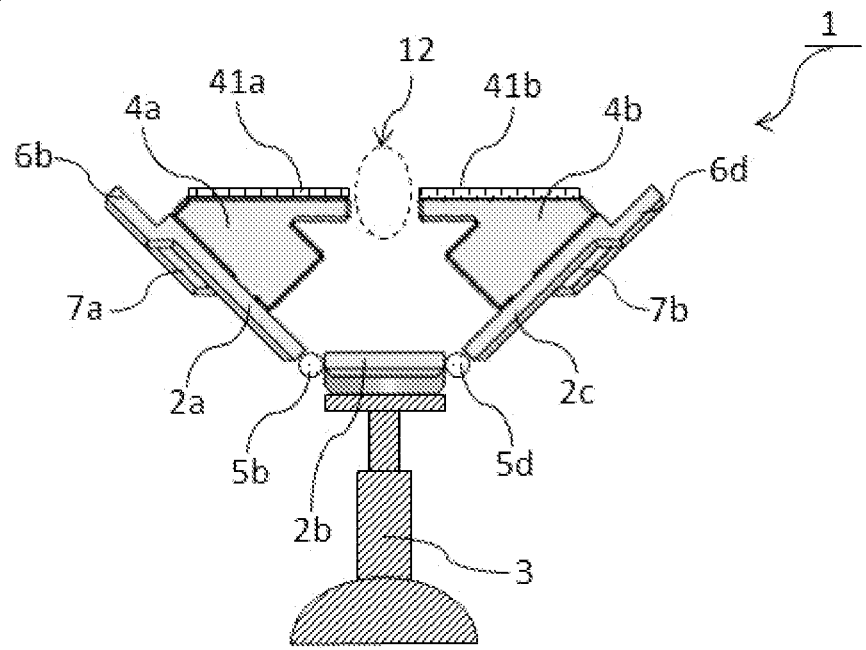
FIG. 5 shows a functional explanatory view of a holding member.
Figure 5:
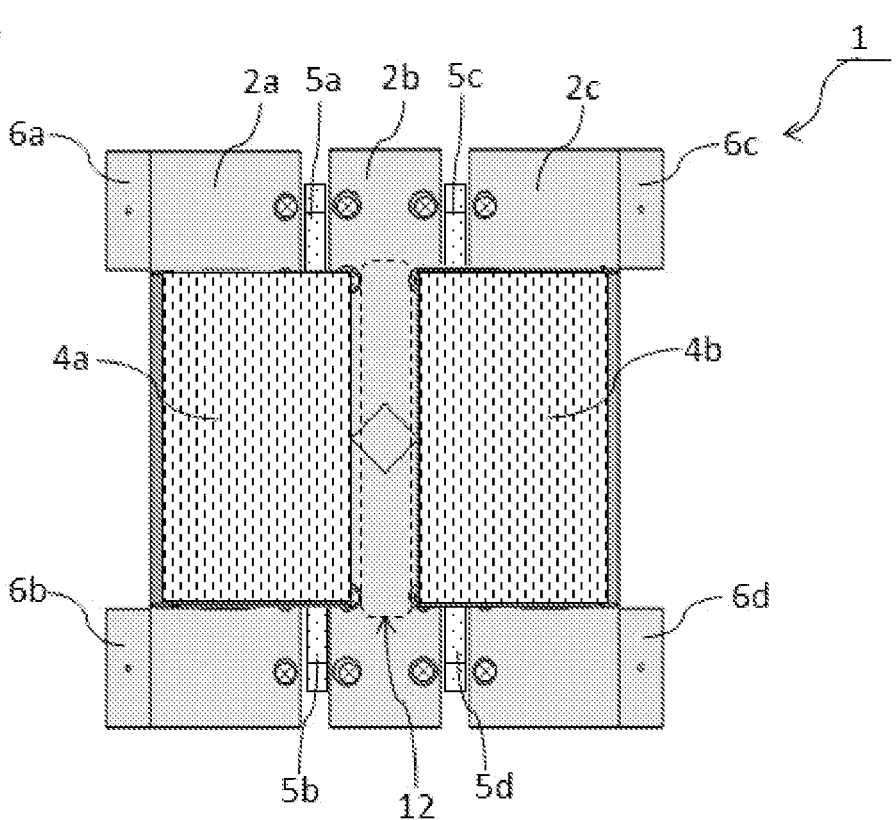

FIG. 5 is a functional explanatory view of a holding member, where (1) is a front view and (2) is a plan view. As shown in FIG. 5 (1), the surface fasteners (41a, 41b) of the holding member (4a, 4b) can be made substantially parallel to each other by bending the plate (2a, 2c) upward by about 45°. As shown in FIGS. 5 (1) and 5 (2), the hook-and-loop fasteners (41a, 41b) do not abut in a substantially parallel state, and a gap 12 is formed.

Because there is no organ resting table inside the patient's body in an actual surgery, the ends of the organs to be anastomosed are floating in the air, and it is necessary to perform anastomosis in such a state. Therefore, fixing the ends of the organ model so as to be arranged in the gap 12 makes it possible to reproduce the state in which the ends of the organs are floating in the air.

Figure 6:
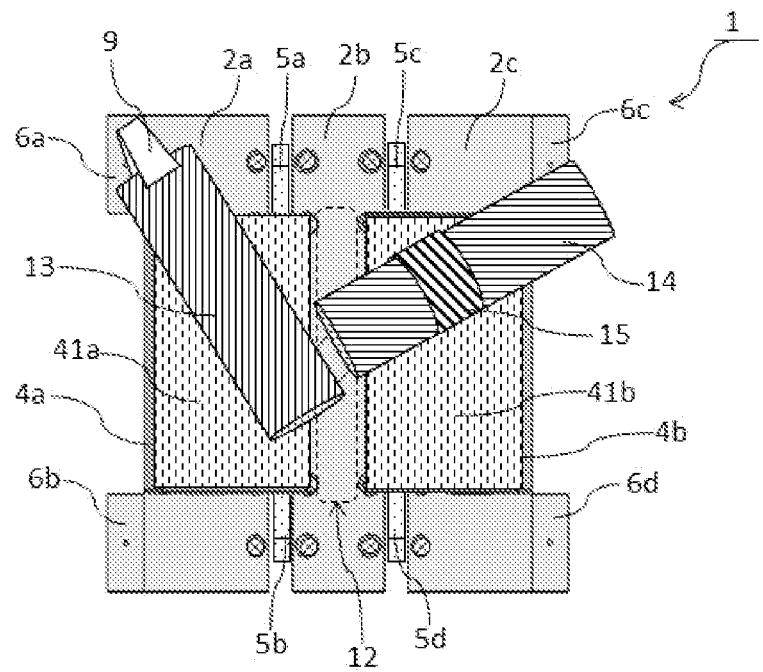
FIG. 6 is an explanatory view of mounting an organ model using a holding member.
Figure 6:
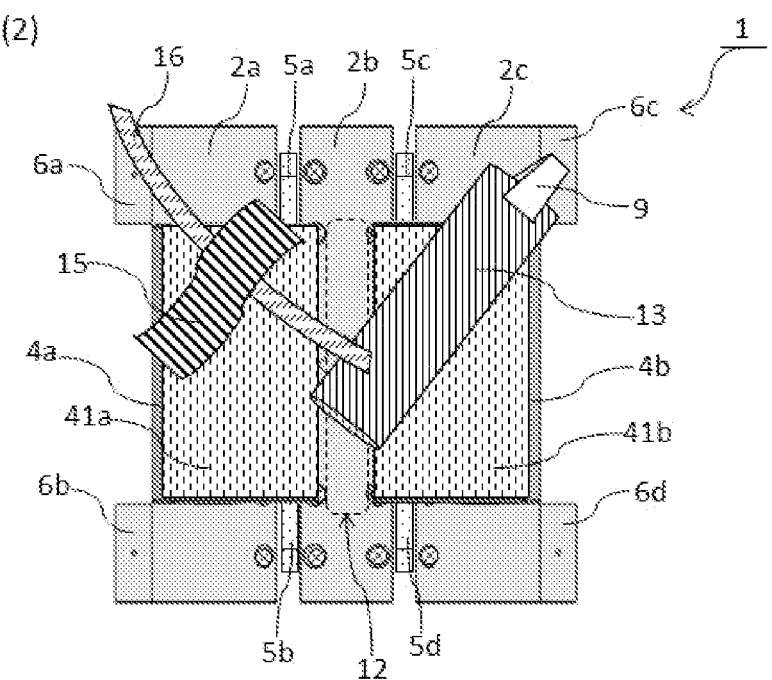

An example of training using the gap 12 will be described by referring to FIG. 6. FIG. 6 is an explanatory view of mounting an organ model using a holding member, in which (1) shows a case wherein an anastomosis training between the pancreas and the jejunum is performed, and (2) shows a case wherein an anastomosis training between the bile duct and the jejunum is performed. In each case, the plates (2a, 2c) are bent upward by about 45°, and the hook-and-loop fasteners (41a, 41b) of the holding members (4a, 4b) are in a substantially parallel state.

When performing anastomosis training between the pancreas and the jejunum, first of all, as shown in FIG. 6 (1), one end of the jejunum model 13 is sandwiched by a clip 9 with a magnet and fixed to the clip fixing portion 6a. The main body of the jejunum model 13 is placed on the holding member 4a so that the other end of the jejunum model 13 is located on the gap 12.

Further, the surface fastener band 15 is provided with a loop portion of the surface fastener on the surface. Therefore, the hook-and-loop fastener band 15 is wound around the body of the pancreas model 14 so that the back surface of the hook-and-loop fastener band 15 comes into contact with the body, and is fixed on the hook-and-loop fastener 41b of the holding member 4b. For fixation, one end of the pancreas model 14 is arranged so as to be located on the gap 12.

As a result, it is possible to reproduce the state in which the ends of the jejunum model 13 and the pancreas model 14 are both floating in the air.

When performing anastomosis training between the bile duct and the jejunum, first of all, as shown in FIG. 6 (2), one end of the jejunum model 13 is sandwiched by a clip 9 with a magnet and fixed to the clip fixing portion 6c. The main body of the jejunum model 13 is placed on the holding member 4b so that the other end of the jejunum model 13 is located on the gap 12.

Further, the bile duct model 16 is placed on the hook-and-loop fastener 41a, and the loop portion of the hook-and-loop fastener band 15 and the hook portion of the hook-and-loop fastener 41a are engaged with each other so as to be attached across the body portion of the bile duct model 16. At the time of attachment, one end of the bile duct model 16 is arranged so as to be located on the gap 12.

As a result, it is possible to reproduce the state in which the ends of the jejunum model 13 and the bile duct model 16 are both floating in the air.

Further, when the clip 9 with a magnet is used, the organ model can be firmly sandwiched, whereas when the hook-and-loop fastener band 15 is used, the fixation can be slightly more loose than in a case using the clip 9 with a magnet. Therefore, if you want to fix the organ so that it does not move supposing an actual operation, use the clip 9 with a magnet, and if you want to fix the organ loosely, use the hook-and-loop fastener band 15 to fix it, enabling such adjustment.

In this way, the multipurpose fixture 1 can be used not only to change the difficulty level of the procedure but also to create a state similar to the actual surgery.

Note that, in this embodiment, as shown in FIG. 5 (1), the plates (2a, 2c) are bent upward by about 45° to make the hook-and-loop fasteners (41a, 41b) substantially parallel. However, it is not essential to bring it into such a state. For example, the plates (2a, 2c) can be used in contact with each other by bending them larger and also the surface provided with the hook-and-loop fasteners (41a, 41b) may be inclined by reducing the bending angle.

Embodiment 2

Figure 7:
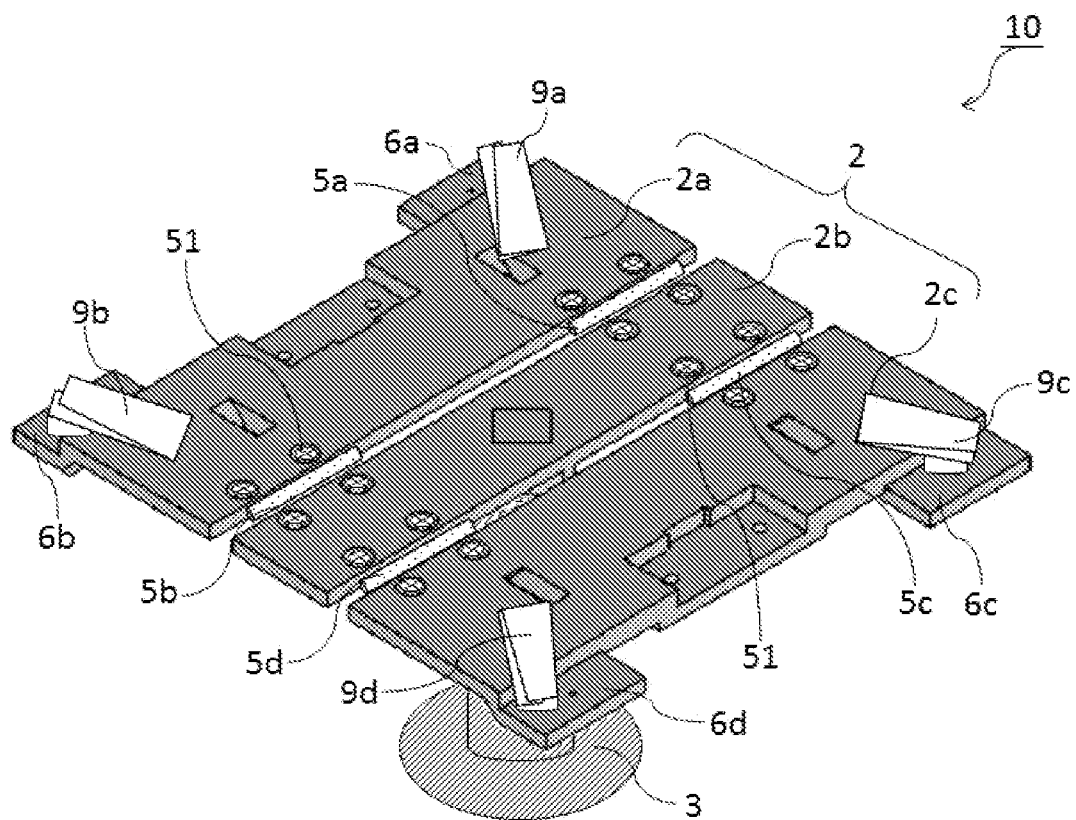
FIG. 7 shows a perspective view of a multi-purpose fixture tool of Embodiment 2.

FIG. 7 shows a perspective view 1 of the multi-purpose fixture tool of Embodiment 2. As shown in FIG. 7, the multipurpose fixture 10 includes a plate connector 2, legs 3 and clips with magnets (9a~9d). The legs 3 are attached to the lower surface of the plate connecting body 2. The clip 9a with a magnet is attached to a clip fixing portion 6a made of a ferromagnetic metal. Similarly, the clip 9b with a magnet is attached to the clip fixing portion 6b, the clip 9c with a magnet is attached to the clip fixing portion 6c, and the clip 9d with a magnet is attached to the clip fixing portion 6d.

In the multipurpose fixture 10, the holding members (4a, 4b) are removed from the multipurpose fixture 1 shown in Embodiment 1. By removing the holding members (4a, 4b), the plate connecting body 2 has a substantially planar shape, and has a shape suitable for arranging a sheet-like object.

It should be noted that the plate connecting body 2 is composed of plates (2a~2c) and is rotatably connected by hinges (5a~5d) similarly as in Embodiment 1.

Figure 8:
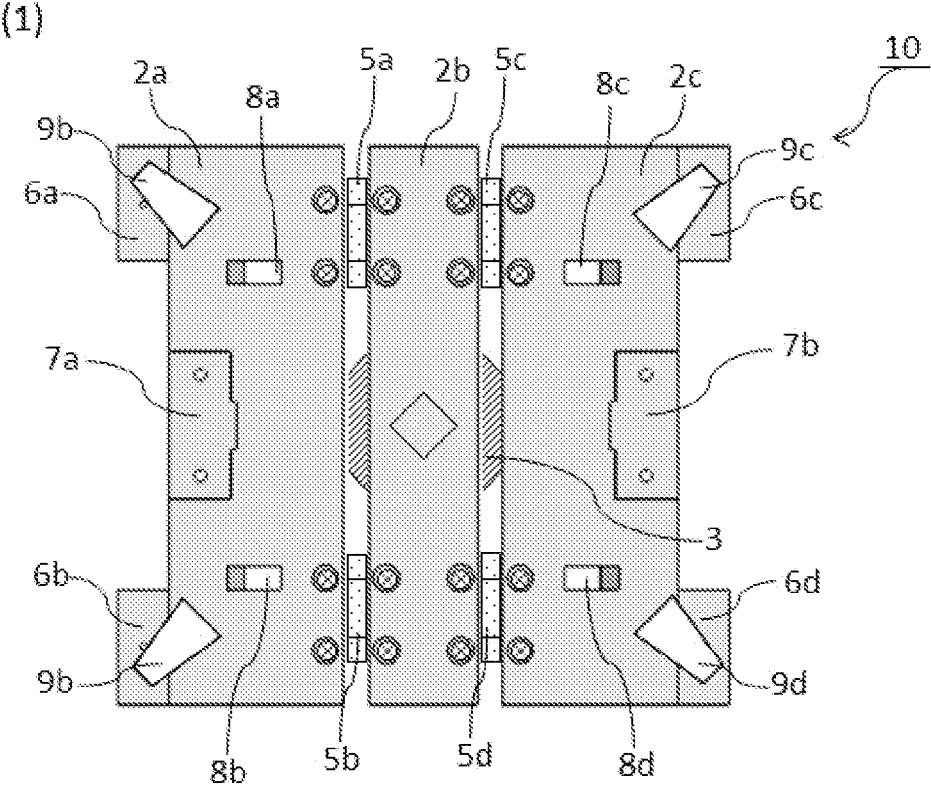
FIG. 8 shows an external view of a multi-purpose fixture tool of Embodiment 2.
Figure 8:
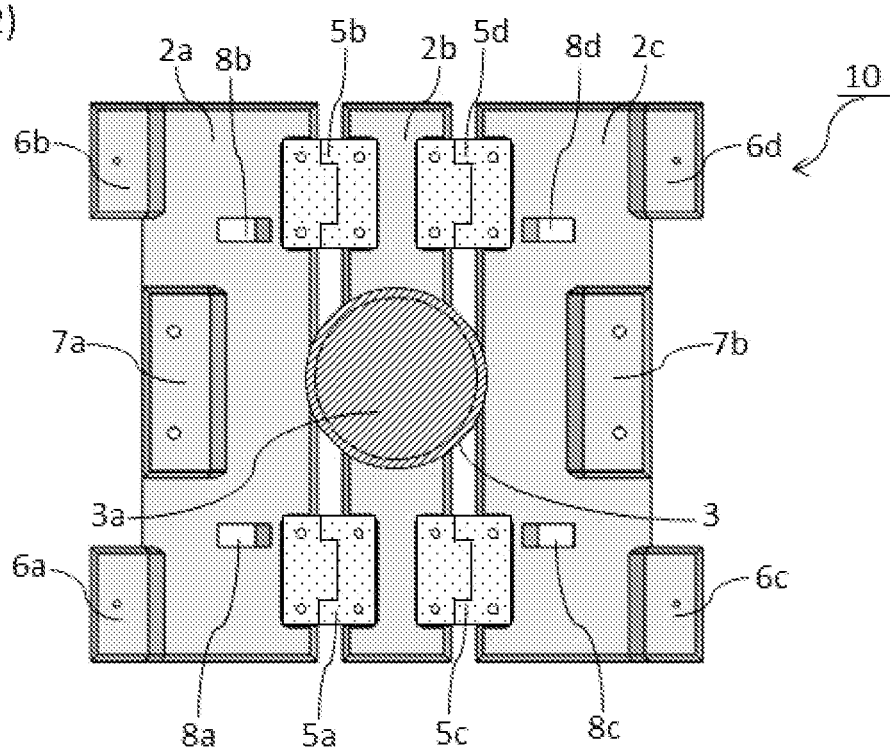

FIG. 8 shows an external view of the multi-purpose fixture tool of Embodiment 2, (1) is a plan view, and (2) is a bottom view.

As shown in FIG. 8 (1), in the multipurpose fixture 10, clips with a magnet (9a~9d) are attached to the clip fixing portion (6a~6d) in advance, but as the clips with magnets (9a~9d) are removable as needed, it is not always necessary to use all of them.

Further, the position of the clip with magnet (9a~9d) can be finely adjusted or the direction can be changed within the range where the clip fixing portion (6a~6d) is provided. Unlike the hook-and-loop fasteners (41a, 41b), the clips with magnets (9a~9d) are to be fixed with clips, so that the fixing method can be selected according to the type and purpose of training. That is to say, for example, when one end of an organ is to be firmly held, a clip with a magnet (9a to 9d) is used, and when the entire organ is to be loosely fixed, the above-mentioned hook-and-loop fastener band 15 and the hook-and-loop fastener (41a, 41b) can be selected for fixing.

As shown in FIG. 8 (1) and FIG. 8 (2), other configurations are the same as those of the multipurpose fixture tool 1 shown in Embodiment 1.

Figure 9:
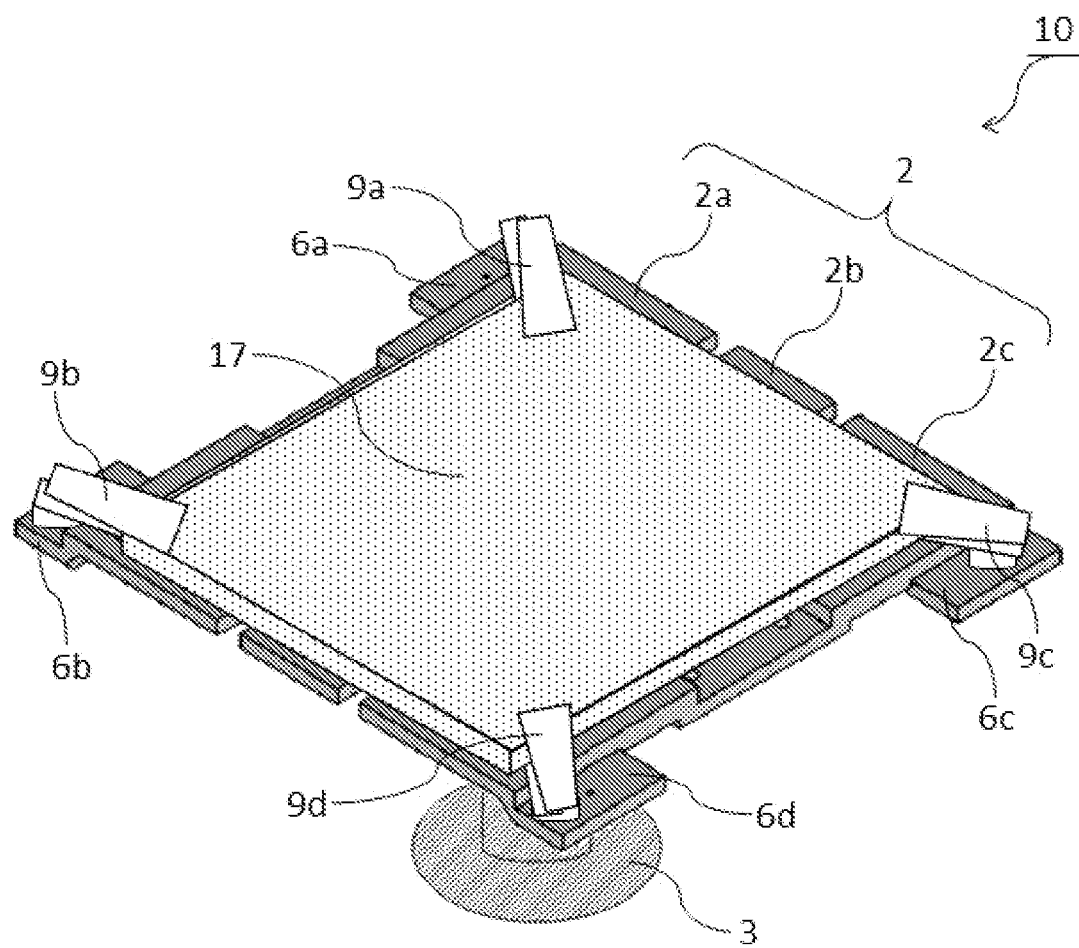
FIG. 9 is a perspective view snowing an example of mounting a release sheet.

FIG. 9 is a perspective view showing an example of mounting the release sheet. As shown in FIG. 9, a release sheet 17 is attached on the plate connecting body 2 of the multipurpose fixture 10. Specifically, the release sheet 17 is placed on the plate connecting body 2, and its four corners are sandwiched and fixed by clips with magnets (9a~9d). Although not shown, the inside of the release sheet 17 simulates the running of internal blood vessels and the position of lymph, and a release layer is provided on the uppermost surface. Note that the thickness of the release layer is about 10 mm.

Since the clips with magnets (9a~9d) are fixed to the clip fixing portions (6a~6d), the operator can perform peeling training in the state shown in FIG. 9.

Figure 10:
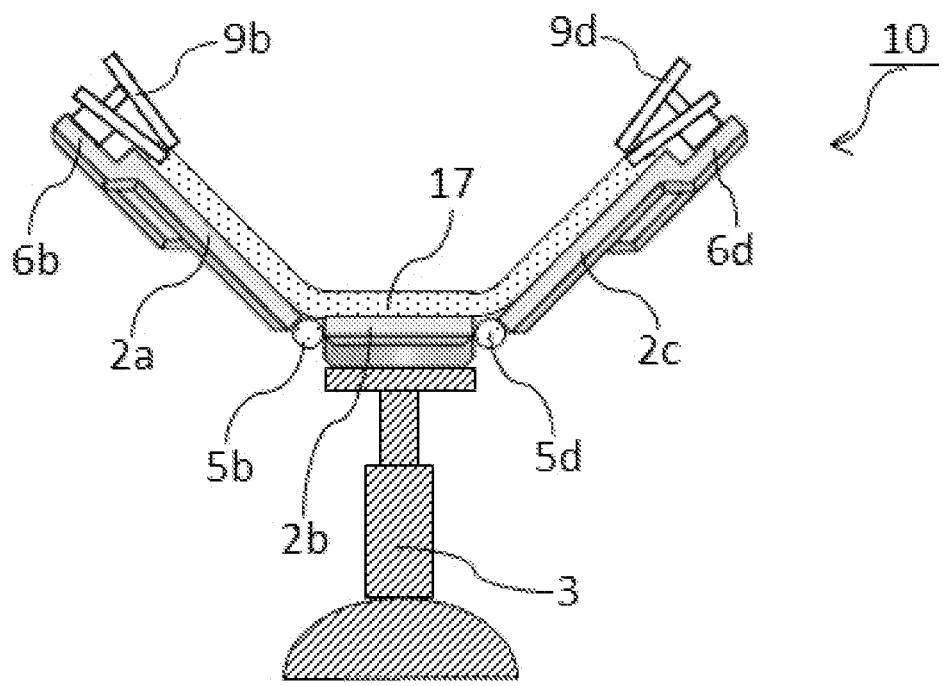
FIG. 10 is a front view showing an example or mounting a release sheet.
Figure 10:
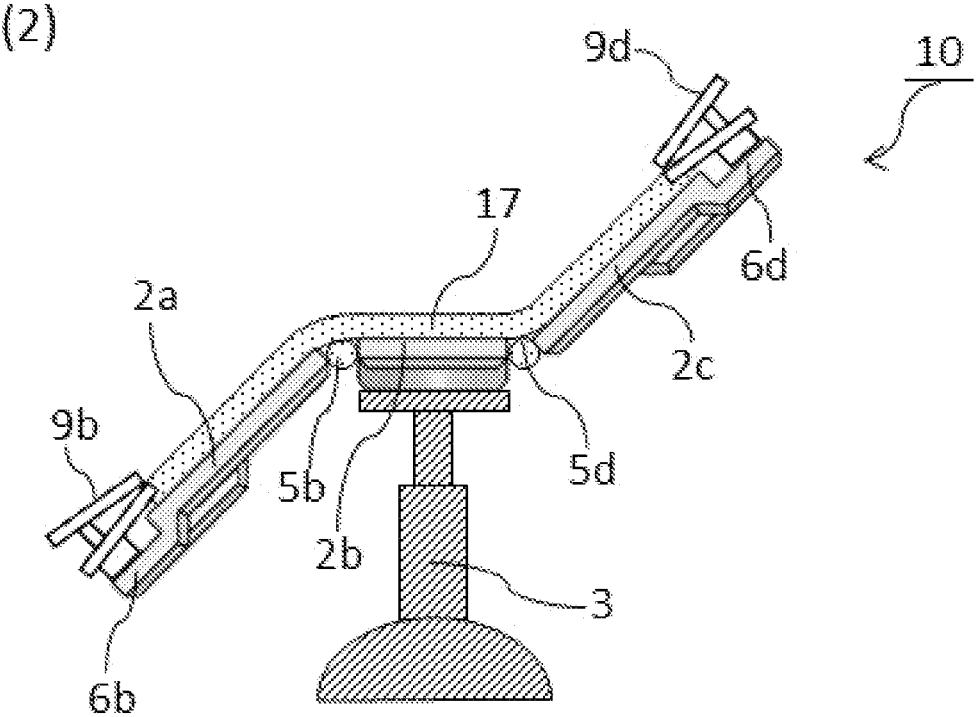

FIG. 10 is a front view showing an example of mounting the release sheet, wherein (1) shows a case when both ends are bent upward, and (2) shows a case when one end is bent downward and the other end is bent upward. As shown in FIG. 10 (1), the multipurpose fixture 10 has the plates (2a, 2c) bent upward by about 45°. As a result, the peeling sheet 17 is in a state where the center is recessed, and the difficulty level of the peeling training is improved.

Further, as shown in FIG. 10 (2), in the multipurpose fixture 10, the plate 2a is bent downward by about 45° and the plate 2c is bent upward by about 45° with the release sheet 17 being attached. As a result, the release sheet 17 not only has a convex portion formed at the boundary portion between the plate 2a and the plate 2b, but also has a concave portion formed at the boundary portion between the plate 2b and the plate 2c. Further, the release sheet 17 is in an inclined state as a whole. As a result, peeling training requires more delicate procedures and increases the difficulty level. As in Embodiment 1, the difficulty level can be further changed by adjusting the bending angle of the plates (2a, 2c).

In this way, it is possible to easily change the difficulty level with a simple operation according to the proficiency level of the surgeon.

Embodiment 3

Figure 11:
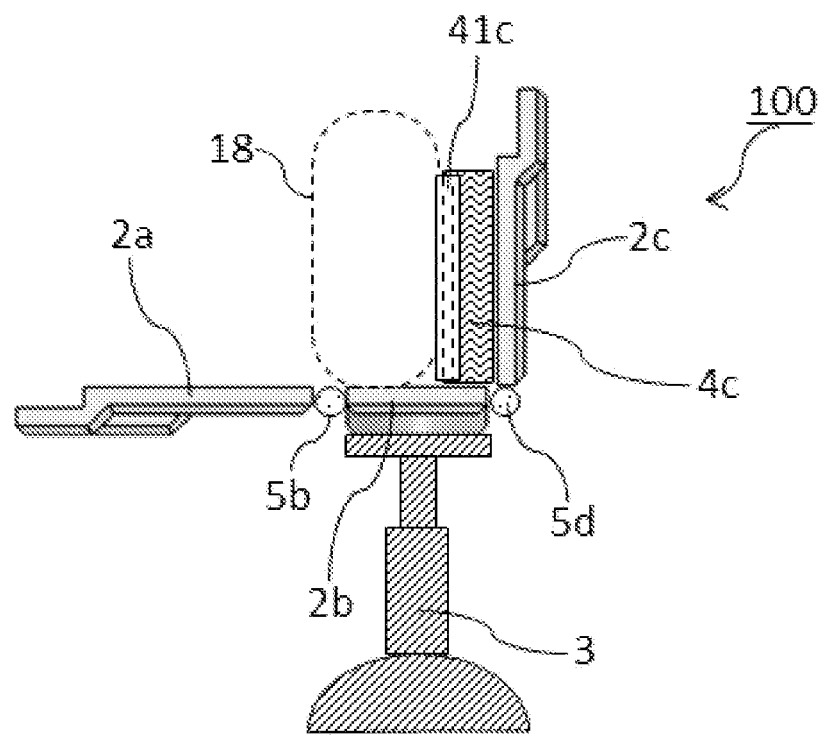
FIG. 11 shows an explanatory diagram of a multi-purpose fixture tool of Embodiment 3.

FIG. 11 shows an explanatory diagram of the multi-purpose fixture tool of Embodiment 3. As shown in FIG. 11, in the multipurpose fixture 100, the holding member 4c is attached to the plate 2c. The holding member 4c is provided with a hook-and-loop fastener 41c so as to be substantially parallel to the plate surface. Therefore, when the plate 2c to which the holding member 4c is attached is bent upward by approximately 90°, not only the plate 2c but also the hook-and-loop fastener 41c becomes perpendicular to the plates (2a, 2b). By attaching the organ model 18 to the holding member 4c via the hook-and-loop fastener 41c in such a state, training for the organ model 18 in the vertical state becomes possible.

OTHER EMBODIMENTS

The plate 2a and the holding member 4a, or at least one of the plates 2b and the holding member 4b may be configured by being connected by a joint mechanism such as a hinge.

INDUSTRIAL APPLICABILITY

The present invention is useful as an instrument for training in surgical operations including thoracoscopic and laparoscopic operations.

DESCRIPTION OF SYMBOLS 1, 10, 100 Multi-purpose fixture tool
2 Plate connecting body
2a~2c Plate
3 Leg portion
3a Suction cup
4a~4c Holding member
5a~5d Hinge
6a~6d Clip fixing portion
7a, 7b Engaging portion
8a~8d Locking portion
9, 9a~9d Clip with magnet
11 Skin model
12 Gap
13 Jejunum model
14 Pancreas model
15 Hook-and-loop fastener band
16 Bile duct model
17 Release sheet
18 Organ model
19 Arrow
41a~41c Hook-and-loop fastener
42a, 42b Holding portion
51 Screw

What is claimed is:

1. A multi-purpose fixture tool for manipulation training, the tool suitable for fixing a biological texture organ that reproduces or deforms a texture and an appearance of one or more actual organs for surgery procedure training, the multi-purpose fixture tool comprising:
   a body, a leg, and a plurality of holding members detachably connectable to said body;
   said body including a rectangular center plate having two long sides, a first plate, and a second plate, said first plate and said second plate disposed opposite one another, said first plate and said second plate each connected rotatably via one or more hinges to a respective long side of said center plate;
   said leg attached to an under surface of said center plate;
   said first and second plates each having a respective holding member with a locking portion;
   each said holding member having a holding surface capable of holding said biological texture organ, said holding surface forming a slope against a plate surface when said holding member is locked to one of the plates.

2. The multi-purpose fixture tool of claim 1, wherein the first plate holding member holding surface does not come into contact with the second plate holding member holding surface, thereby forming a gap above the central plate when the first plate and the second plate are rotated on their hinges into a gap-forming hinge position.

3. The multi-purpose fixture tool of claim 2, wherein said gap is bisymmetrical around a long axis of the central plate.

4. The multi-purpose fixture tool of claim 1, configured such that at least one of the following holds:
- an angle between a normal of the first plate holding member holding surface and a normal of a surface of the first plate is in a range of 40~50° when said first plate holding member is locked to said first plate; or
- an angle between a normal of the second plate holding member holding surface and a normal of a surface of the second plate is in a range of 40~50° when said second plate holding member is locked to said second plate.

5. The multi-purpose fixture tool of claim 1, wherein at least one holding member at least partially defines a recess on a side of the central plate, said recess capable of storing a part of the biological texture organ when the at least one holding member is locked to one of the plates.

6. The multi-purpose fixture tool of claim 1, wherein the fixture tool further includes a fastener and a fastener stationary portion, the fastener stationary portion capable of fixing the fastener to at least one of the plates.

7. The multi-purpose fixture tool of claim 6, wherein the fastener comprises a magnet, and at least part of at least one of the plates is made of a metal or an alloy which exhibits ferromagnetism.

8. The multi-purpose fixture tool of claim 1, wherein the leg member includes a joint mechanism or a ball joint mechanism, and the posture of the central plate is adjusted by using the mechanism.

9. The multi-purpose fixture tool of claim 1, wherein the first plate and the second plate are each rectangular.

10. The multi-purpose fixture tool of claim 9, wherein the first plate and the second plate each have a long side which is as long as the long sides of the central plate.

11. The multi-purpose fixture tool of claim 1, wherein the first plate and the second plate each have a polygonal shape.

12. The multi-purpose fixture tool of claim 11, wherein the first plate and the second plate each have a side which is as long as the long sides of the central plate.

13. The multi-purpose fixture tool of claim 1, wherein the first plate and the second plate each have a partially curved shape.

14. The multi-purpose fixture tool of claim 13, wherein the first plate and the second plate each have a side which is as long as the long sides of the central plate.

15. The multi-purpose fixture tool of claim 1, wherein the first plate and the second plate have the same shape and are symmetrical with respect to a long axis of the central plate.

16. The multi-purpose fixture tool of claim 1, wherein at least one of the holding surfaces includes a portion of a hook-and-loop fastener.

17. The multi-purpose fixture tool of claim 1, wherein the leg includes a suction cup.

18. The multi-purpose fixture tool of claim 1, wherein the fixture tool further includes a clip with a magnet and a clip fixing portion, the clip fixing portion and the clip detachably magnetically connectable to one another.

19. The multi-purpose fixture tool of claim 1, in combination with the biological texture organ, wherein the biological texture organ is loosely fixed by the fixture tool.

20. The multi-purpose fixture tool of claim 1, in combination with the biological texture organ, wherein the biological texture organ is fixed by the fixture tool using a magnetic fastener.

* * * * *